Nov. 1, 1927.  1,647,368
J. E. LOVELY
OVERHEAD TOOL ATTACHMENT FOR LATHES
Filed Aug. 28, 1924   3 Sheets-Sheet 1
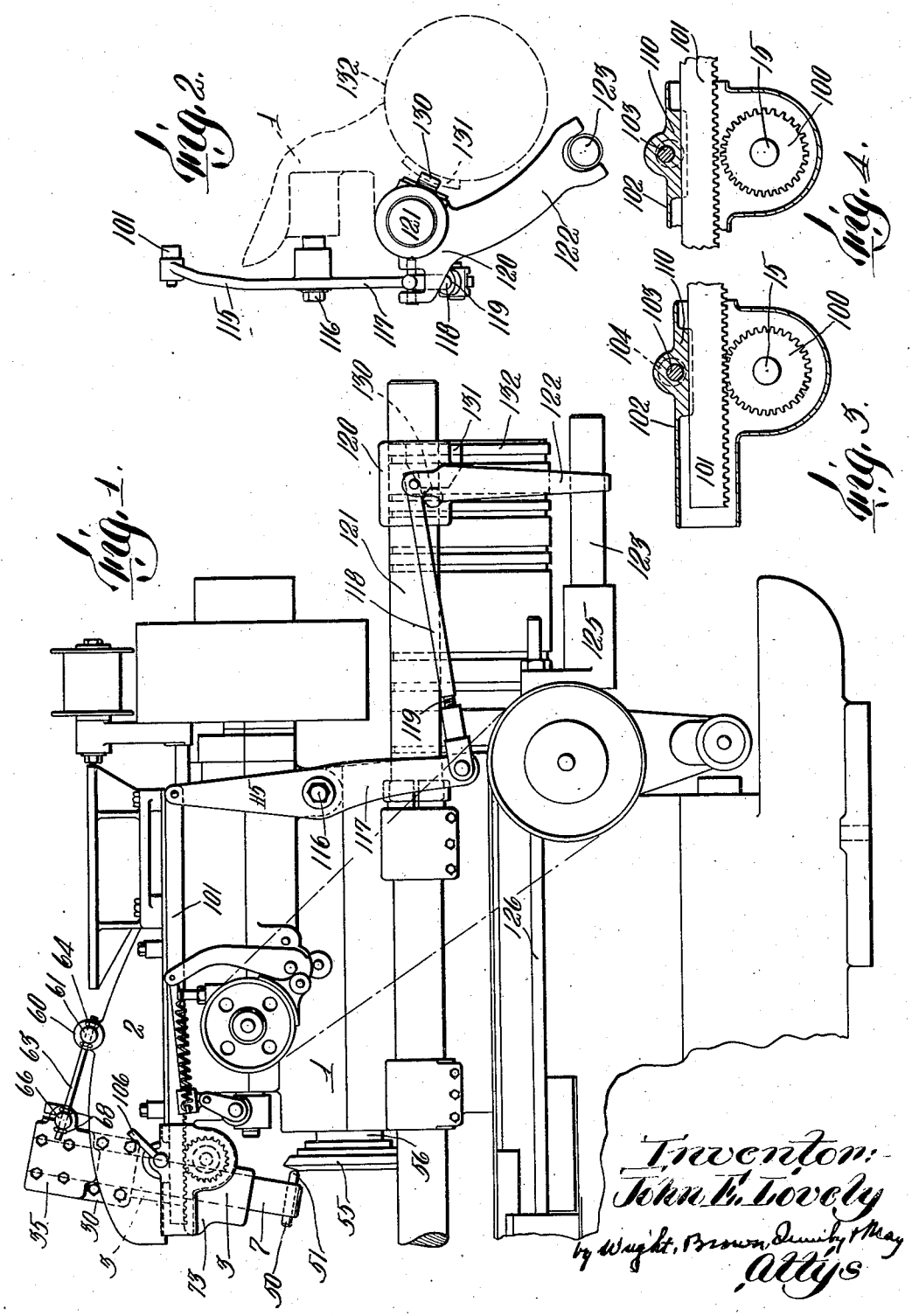

Nov. 1, 1927.
J. E. LOVELY
1,647,368
OVERHEAD TOOL ATTACHMENT FOR LATHES
Filed Aug. 28, 1924   3 Sheets-Sheet 2
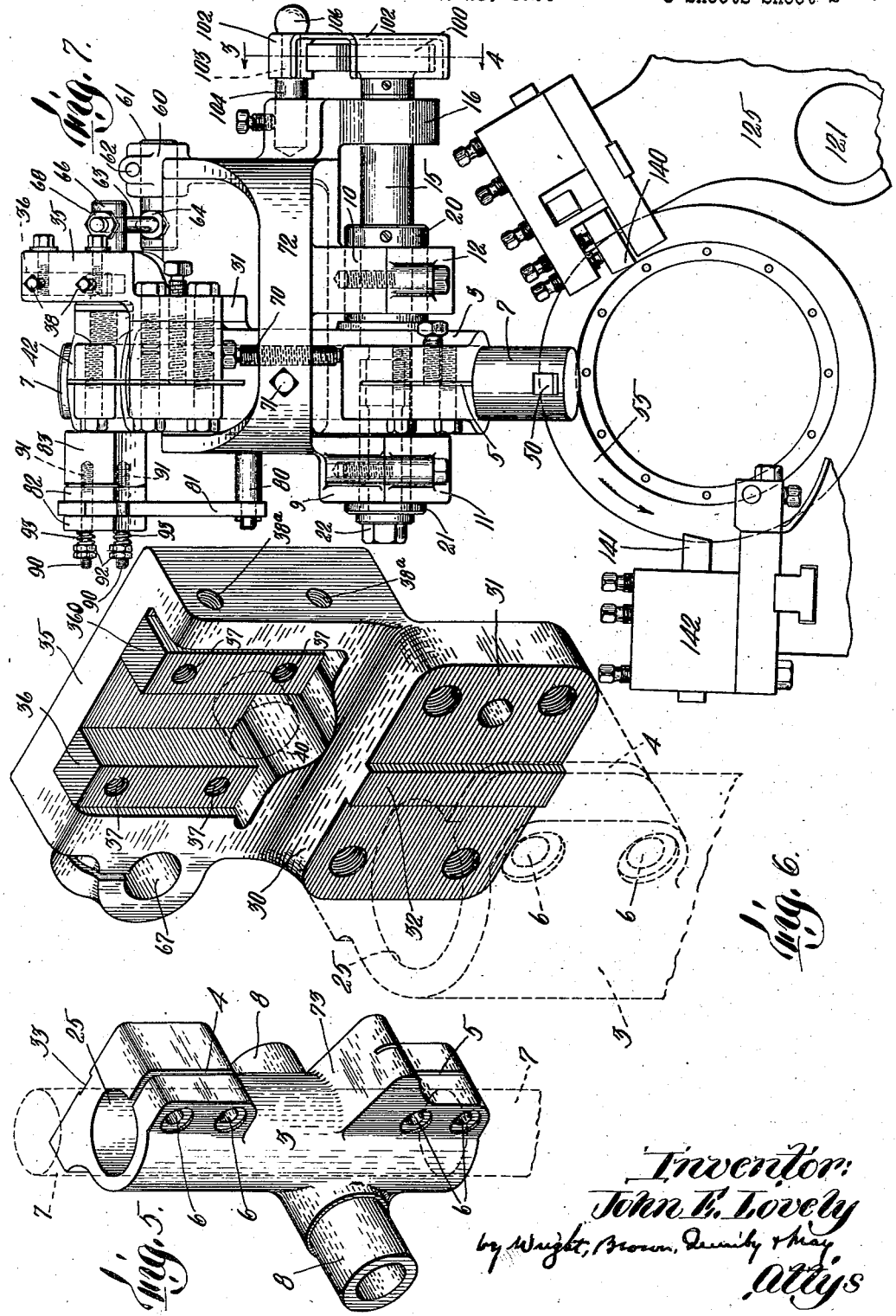
Inventor:
John E. Lovely
by Wright, Brown, Quinby & May
attys Nov. 1, 1927. 1,647,368
J. E. LOVELY
OVERHEAD TOOL ATTACHMENT FOR LATHES
Filed Aug. 28, 1924     3 Sheets-Sheet 3
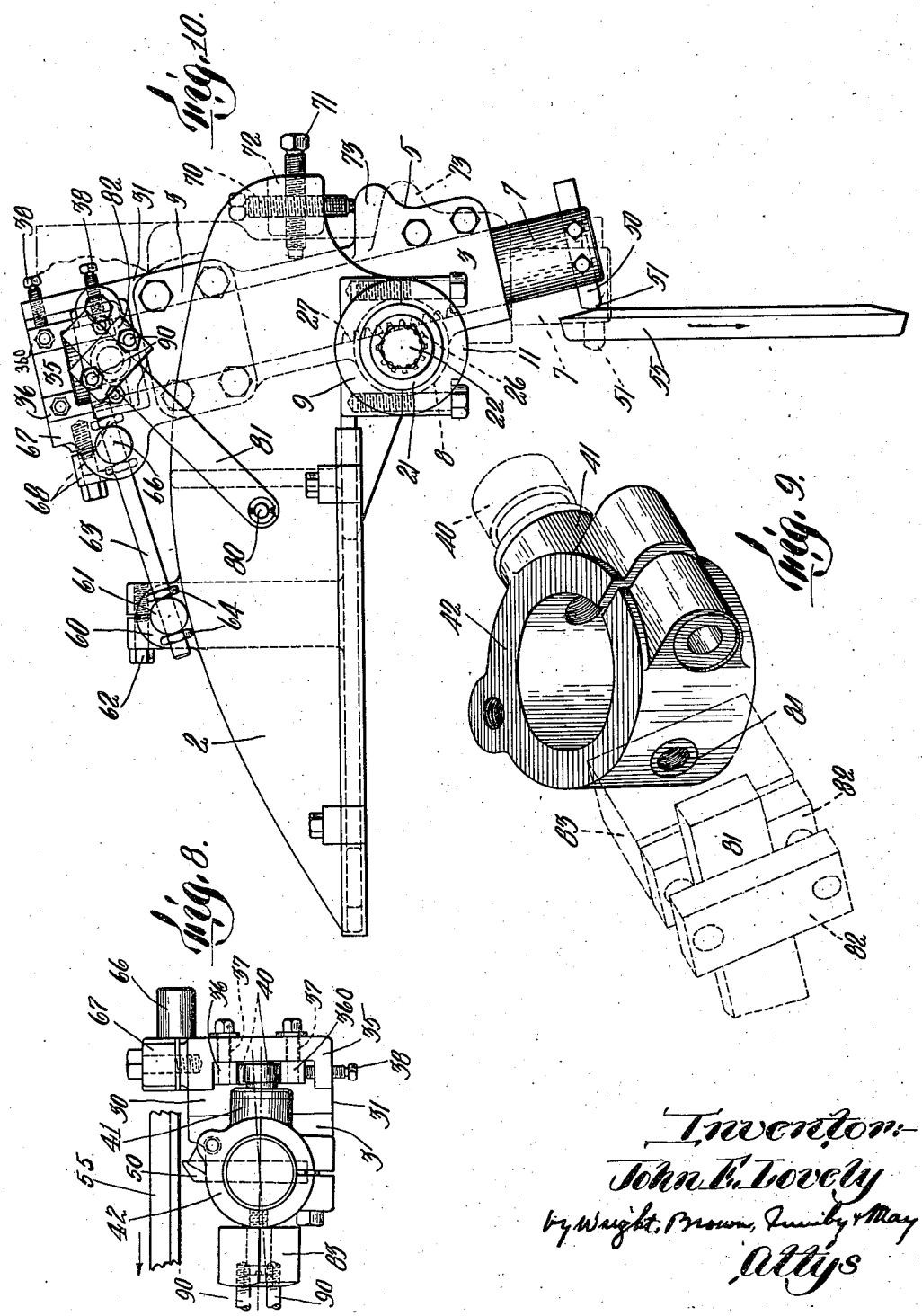

Patented Nov. 1, 1927.

1,647,368

UNITED STATES PATENT OFFICE.

JOHN E. LOVELY, OF SPRINGFIELD, VERMONT, ASSIGNOR TO JONES & LAMSON MACHINE COMPANY, OF SPRINGFIELD, VERMONT, A CORPORATION OF VERMONT.

OVERHEAD TOOL ATTACHMENT FOR LATHES.

Application filed August 28, 1924. Serial No. 734,588.

This invention relates to a tool carrying attachment particularly designed for use on the well known Fay lathe and by which a tool in addition to those commonly employed may be carried by the headstock of the lathe and controlled so as to act on work rotating with the work spindle. In this attachment the tool is given a traversing movement to carry it across the work and is so arranged that during the working traverse the tool is held to the work and during the return traverse it is retracted from the work to an extent sufficient to clear it. By this action the tool is prevented from scoring the work on its return traverse.

For a more complete understanding of this invention reference may be had to the accompanying drawings in which Figure 1 is a fragmentary rear elevation of a Fay lathe showing the attachment of this invention applied.

Figure 2 is an elevation of a portion of the tool actuating mechanism, certain portions of the lathe being indicated in dotted lines.

Figures 3 and 4 are detail sections on lines 3—4 of Figure 7, showing certain parts in different positions.

Figure 5 is a perspective of the tool bar supporting sleeve.

Figure 6 is a perspective of the cam guide member, the upper end of the tool bar sleeve being shown in dotted lines as assembled therewith.

Figure 7 is an elevation of the attachment looking toward the face of the work and showing the relative positions of various tools.

Figure 8 is a detail plan showing certain of the parts in assembled relation.

Figure 9 is a perspective of the tool bar cam follower carrier, certain related parts being shown in dotted lines.

Figure 10 is a front elevation of the attachment showing the work in operative relation to its tool.

Referring to Figure 1, at 1 is indicated the headstock of a lathe to the upper face of which is fixed a support 2 in the form of a casting bolted to the headstock, this support carrying the tool bar. Pivotally mounted on the support is a sleeve 3 shown detached in Figure 5. Referring to this figure it will be noted that the sleeve is split, as shown at 4 and 5, the split portions being adapted to be drawn together to an adjustable extent by suitable bolts extending between these parts and passing through openings 6 therein. By this means the sleeve may be adjusted to permit a tool bar 7 to pass therethrough with capability of axial sliding and rocking therein without undue lost motion.

The pivotal connection of the sleeve 3 on the support is provided by a pair of oppositely disposed sleeved trunnions 8 mounted in spaced bearings 9 and 10 depending from the forward end of the support 2, each of these bearings being formed with detachable cap plates 11 and 12 which facilitate the assembling and disassembling of the parts. The sleeve 8 has passed therethrough a shaft 15, this shaft also passing through a bearing lug 16 extending rearwardly from the forward portion of the support 2 in alinement with the bearings 9 and 10. The shaft 15 is held in position axially by means of a collar 20 fixed thereon and bearing against the rear face of the bearing 10 and a washer 21 held in position against the forward face of the bearing 9 by means of a stud 22 threaded in the forward end of the shaft 15. Opposite the longitudinal bore 25 of the sleeve 3 the shaft 15 has cut thereon pinion teeth 26 which mesh with rack teeth 27 cut in one side of the tool bar 7. By turning this shaft 15 therefore it is evident that the tool bar 7 will be reciprocated axially within the sleeve 3.

Fixed to the upper end of the sleeve 3 is a sliding guide member 30 shown detached in Figure 6. This guide member has a flat portion 31 against which the inner face of the upper portion of the member 3 engages, there being a dovetail piece 32 on one of these members engaging in a corresponding groove 33 in the other member to hold them in fixed position. Above the portion 31 the member 30 has an inwardly offset portion 35 channel-shaped in cross section within the channel of which may be fixed spaced hardened steel wear pieces or blocks 36 and 360. These blocks may be fixed to the rear wall of the channel section portion 35 by means of screws passing through suitable perforations 37 therein and they may be adjustably spaced by means of screws 38 passing through perforations 38ª in one of the flanges of the portion 35 and having their ends bearing against the adjacent side of one of the blocks as 360.

Between the blocks 36, 360 may ride a cam roller 40 journaled on a boss 41 extending inwardly from a split sleeve 42, shown detached in Figure 9, which may be clamped rigidly to the upper end of the tool bar 7. The spacing of the wear pieces or blocks 36, 360 is greater than the diameter of the roller 40 so that the tool bar is permitted a slight rocking motion, the roller 40 bringing up against the wear pieces on either side acting to limit the extent of such rotation.

At the lower end of the tool bar is positioned the tool 50 which has its cutting edge 51 eccentrically disposed relative to the axis of the tool bar, the position of the parts being such that when the tool bar is rotated to one limit of its motion in the direction of movement of the work 55 as it is rotated with the work spindle 56 in the machine headstock 1, it approaches the work to take a cut therein. When the tool bar is rotated in a direction to bring the roller 40 against the opposite wear piece 36 the tool is caused to retract slightly from its former position, this being effected, as will later appear, by the retracting stroke of the tool bar so that the tool is prevented from scoring the work face over which it has cut on its working traverse.

The tool bar extends downwardly at an angle to the axis of the spindle 56 and in order to adjust this angle the guide member 30 with the sleeve 3 is arranged to be held in adjustably fixed relation to the support 2. For this purpose the support 2 has a split bearing portion 60 extending upwardly therefrom back from its forward end and in this bearing is mounted a stub shaft 61, this shaft being fixed within the bearing 60 by means of a tightening bolt 62 passed through one of the split portions of this bearing and having its inner end threaded in the other portion. The shaft 61 is laterally perforated for the reception of the inner end of a tie rod 63 which has a pair of nuts 64 threaded thereon and arranged to bear against opposite faces of the shaft 61. The outer end of the tie rod 63 passes in the same manner through a transverse opening in a shaft 66 adjustably fixed in a split bearing 67 extending rearwardly from the member 30. Nuts 68 threaded on the tie rod 63 and engaging opposite faces of the shaft 66 act to determine the axial position of the tie rod relative to the shaft 66. By adjustment of these nuts 64 and 68 it is evident that the distances between the shafts 61 and 66 may be adjusted and thus determine the angular relation between the tool bar 7 and the support 2. A finer and more positive adjustment of this angular relation may be effected by means of adjusting screws 70 and 71, the adjusting screw 70 passing through the forward end of the support 2 through a transverse tie portion 72 and bearing at its lower end against the extended upper face 73 of the split bearing 5 of the sleeve 3, and the screw 71 passing through the same tie member 72 and bearing at its inner end against the outer face of the sleeve 3.

Friction means tending to hold the tool in cutting position on the cutting stroke and rocked away on the return stroke has been devised. Pivoted at 80 to the support 2 is the rear end of a flat bar 81. The forward end of this bar is slidably guided between a pair of friction blocks 82 which may, if desired, be of fiber. These blocks are carried on a block 83 pivoted to the sleeve member 42, on the stud 420 threaded in a perforation 84 in its forward face as shown in Figure 9 and is firmly seated in a counterbored portion 840 thereof. Passing through perforations in the plates 82 at either side of the bar 81 are studs 90 having their inner ends threaded as at 91 in the block 83 and having threaded on their outer ends pairs of nuts 92. Between these nuts and the outer plate 82 are positioned coil springs 93 surrounding the studs.

The outer face of the block 83 is rounded or beveled so that the friction blocks 82 may bear flat against the bar 83 throughout the range of rocking movement permitted the sleeve 42. On the downward traverse of the the tool bar the friction blocks 82 are caused to slide down the bar 81, which is inclined upwardly toward the tool bar, and their resistance to such sliding motion imparts an eccentric thrust to the sleeve 42, causing it to turn until the roller 40 bears against the piece 36 and to retain the sleeve in that position during this stroke of the tool bar with the tool in its projected position. On the upward traverse of the tool bar the friction blocks slide upwardly on the bar 81, and their resistance to such motion rocks the sleeve 42 in the opposite direction until the roller 40 bears on the piece 360 in which position the tool is retracted, and it is so held during the return stroke of the tool bar. Thus immediately as one or the other traverse motion is imparted to the tool, it is turned into or out of its cutting position, depending on the direction of such traverse. Furthermore, the direction of movement of the tool from its retracted to its projected positions is such that the pressure of the work thereon during the cutting traverse tends to hold it in projected position, the direction of motion of the tool toward its projected position being the same as that of the adjacent surface of the work against which it is to operate.

Provision is made by which the tool bar is given its traversing strokes in the desired time relation with respect to the other tools carried by the machine. For this purpose, to the rear end of the shaft 15 is fixed a gear 100, which, as shown best in Figures 3 and 4, may be engaged by the forward portion of a rack bar 101. This rack bar is slidably guided within a partial housing 102 which is journaled on an eccentric portion 103 of a rock shaft 104. To the outer end of this rock shaft outwardly of the casing 102 may be fixed a handle 106 by which it may be rotated. The housing 102 has a guide portion 110 which may rest against the upper face of the rack bar 101 and when the shaft 104 is turned to bring the eccentric portion 103 in its lower position, as shown in Figure 3, this guide portion holds the rack bar into engagement with the teeth of the gear 100. By rotating this shaft 104 to bring the eccentric portion 103 to its upper limit, as shown in Figure 4, the guide portion 110 is raised, permitting the rack bar 101 to be raised out of mesh with the teeth of the gear 100. When the parts are in this position, as shown in Figure 4, the rack bar may be moved axially free from the gear 100 and may then be placed in engagement therewith in the desired relative position, this construction furnishing means for effecting a coarse adjustment between the axial position of the rack bar 101 and the axial position of the tool bar 7. By this means the limits of stroke of the tool bar may be adjusted at will. The rear end of the rack bar 101 is pivoted to the upper end of a lever 115 fulcrumed at 116 to the lathe headstock. The lower end 117 of this lever is pivoted to the outer end of a rod 118, this rod having a turnbuckle 119 therein for adjustment of its length. The inner end of this rod 118 is pivoted to a sliding guide member 120 mounted to slide on a rod or a bar 121 which may, if desired, be one of the tool controlling bars such as are used on the well known Fay lathes. In order to prevent relative rocking between the member 120 and the bar 121 this member is provided with a depending arm 122 having a forked lower end, the sides of the fork engaging opposite sides of a guide bar 123. This guide bar may, if desired, be that employed to slidably guide a carriage 125 to which the inner end of one of the former actuating rods 126 for controlling the angular relation of the tool carriage of the Fay lathe is attached.

The member 120 has fixed thereto a cam follower 130 adapted to be engaged by a suitable cam piece 131 fixed to the cam drum 132 employed in the Fay lathe for controlling the actions of the various tools. In Figure 7 this attachment is shown as applied to the machine when it is desired to face off a ring gear therewith. Referring to this figure it will be seen that the tool 50 is caused to take a finishing cut on the inclined outer face of the gear blank in the manner shown in Figure 10, the roughing cut being taken immediately prior thereto by a tool 140 on the back tool carriage, other portions of the blank being machined at suitable times by tools as 141 supported in the front carriage 142, the direction of rotation of the work being indicated by the arrow. It will be understood, of course, that the traverses of the tool bar are effected by the cam piece on the cam drum controlling the position of the member 120 relative to its guiding bars.

Having thus described an embodiment of this invention it should be evident to those skilled in the art that various modifications and changes might be made therein without departing from its spirit or scope as defined by the appended claims.

I claim:

1. An attachment for a machine having a headstock and a rotary spindle therein, which comprises a support attachable to said headstock, a tool bar axially slidable on said support at an angle to the axis of said spindle, a tool having its cutting edge eccentrically carried by said bar, and means for rocking said bar to cause said tool to be retracted from the work during the return traverse of said bar.

2. In combination with work supporting means, of a rockable tool bar, means for traversing said tool bar to cause a tool carried thereby to traverse work carried by said supporting means, and means for rocking said tool bar to bring the tool into and hold it in operative relation to the work on one direction of traverse of said bar and for rocking said bar in the opposite direction and so holding it to clear the tool from the work on the return direction of traverse.

3. In a machine of the class described, a rotary work spindle, a rockable tool bar reciprocable across work rotatable with said spindle, a tool carried by said bar and movable by the rocking of said bar toward and from the work, means to limit the rocking of said bar in both directions, and means tending to rock said bar to and hold it to one of its limits as said bar reciprocates in one direction and to rock said bar to and hold it to the other of said limits as said bar reciprocates in the opposite direction.

4. In a machine of the class described, a rotary work spindle, a rockable tool bar reciprocable across work rotatable with said spindle, a tool carried by said bar and movable by the rocking of said bar toward and from the work, means to limit the rocking of said bar in both directions, and means tending to rock said bar to and hold it to one of its limits as said bar reciprocates in one direction and to rock said bar to and hold it to the other of said limits as said bar reciprocates in the opposite direction, the direction of rocking of said bar to bring the tool toward the work being the same as that of the adjacent portion of the work rotated with said spindle, whereby the pressure of the work on the tool also tends to hold the tool to the work.

5. An attachment for a machine having a headstock, and a rotary spindle in said headstock, said attachment comprising a support attachable to said headstock, a guide sleeve carried by said support, a tool bar slidable and rockable in said sleeve, said tool bar being movable across the face of work rotatable with said spindle, means for reciprocating said tool bar as said spindle rotates, a tool carried by said bar to approach and recede from the work on the rocking of said bar, means to limit the extent of such rocking movement, an actuator bar carried by said support and projecting in an inclined direction toward said tool bar, and friction means eccentrically carried by said tool bar and slidably engaging said actuating bar, the frictional engagement of said friction means on said actuating bar acting to rock said tool bar to one of its limits and there hold it during its reciprocation in one direction and to rock said tool bar to the other of its limits and there hold it during its reciprocation in the opposite direction.

6. In a machine of the class described, a reciprocable and rockable tool bar, a tool carried by said bar, means to limit the rocking of said tool bar in both directions, means for reciprocating said tool bar to cause said tool bar to effect traverses across work, and means to rock and hold said bar to one of its limits while it is being traversed in one direction to hold the tool to the work and to rock and hold said bar to its other limit as it is traversed in the opposite direction to retract the tool from the work.

7. An attachment for a machine having a headstock, and a rotary spindle in said headstock, said attachment comprising a support carried by said headstock, an axially reciprocable tool bar carried by said support for traversing work rotatable with said spindle, means including a rotary shaft for reciprocating said tool bar, pinion teeth on said shaft, a rack bar engageable with said teeth, means for traversing said rack bar, and means for holding said rack bar in engagement with said pinion teeth and actuable to release said rack bar therefrom to permit adjustment of said rack bar relative thereto.

8. The combination with a machine having a headstock and a rotary spindle in said headstock, of a support carried by said headstock, an axially reciprocable tool bar carried by said support for traversing work rotatable with said spindle, means including a rotary shaft for reciprocating said tool bar, pinion teeth on said shaft, a rack bar engageable with said teeth, means for traversing said rack bar, a member for holding said rack bar in engagement with said teeth, and means for moving said member into and out of operative holding position.

In testimony whereof I have affixed my signature.

JOHN E. LOVELY.